United States Patent
Norkus

[11] Patent Number: 5,570,867
[45] Date of Patent: Nov. 5, 1996

[54] SHOCK MOUNT ASSEMBLY

[75] Inventor: James Norkus, Waterbury, Conn.

[73] Assignee: Illinois Tool Works, Inc., Glenview, Ill.

[21] Appl. No.: 529,429

[22] Filed: Sep. 18, 1995

[51] Int. Cl.[6] .................................................. F16M 13/00
[52] U.S. Cl. ........................ 248/635; 248/609; 248/562
[58] Field of Search ................................. 248/635, 609,
248/562, 568, 636, 621; 411/182, 432,
177, 173, 900, 901, 902, 908; 52/464, 468

[56] References Cited

U.S. PATENT DOCUMENTS

| | | | |
|---|---|---|---|
| 2,144,170 | 1/1939 | Utz et al. | 296/35 |
| 2,520,757 | 8/1950 | Cain | 248/22 |
| 2,708,560 | 5/1955 | Paley | 248/204 |
| 3,128,999 | 4/1964 | Schmitt | 267/1 |
| 3,193,237 | 7/1965 | Adams | 248/358 |
| 3,218,101 | 11/1965 | Adams | 296/35 |
| 3,622,194 | 11/1971 | Bryk | 296/35 R |
| 4,014,588 | 3/1977 | Kohriyama | 296/35 R |
| 4,286,777 | 9/1981 | Brown | 267/63 R |
| 4,513,990 | 4/1985 | Morita et al. | 280/725 |
| 4,720,075 | 1/1988 | Peterson et al. | 248/635 |
| 4,783,039 | 11/1988 | Peterson et al. | 248/635 |
| 5,174,540 | 12/1992 | Gilliam | 248/635 |
| 5,405,118 | 4/1995 | Dietz et al. | 248/635 |
| 5,409,283 | 4/1995 | Ban | 248/635 |

FOREIGN PATENT DOCUMENTS 586608  3/1947  United Kingdom ................ 267/141.3

Primary Examiner—Leslie A. Braun
Assistant Examiner—Willie Berry, Jr.
Attorney, Agent, or Firm—St. Onge Steward Johnston & Reens

[57] ABSTRACT

An improved shock isolating mount is provided that permits selection of either a high or a low separation strength. The shock mount comprises interfitting flanged spacer and thimble members and resilient rings mounted thereto. The thimble is formed from a hollow plastic stem and a metal base. The metal base includes a flange and an internally threaded post. The thimble stem fits over and snaps onto the post. The metal base member is made in either a high strength or low strength configuration. Selection of the appropriate configuration of base member provides a shock mount assembly of the desired separation strength.

29 Claims, 3 Drawing Sheets

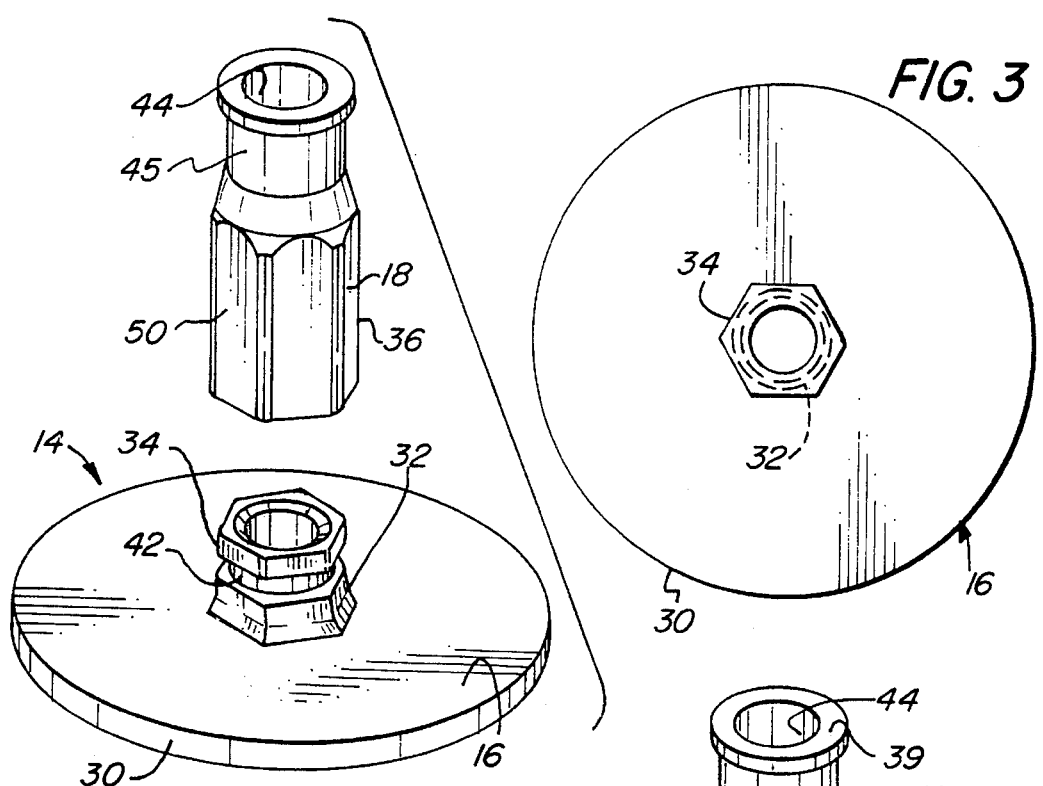
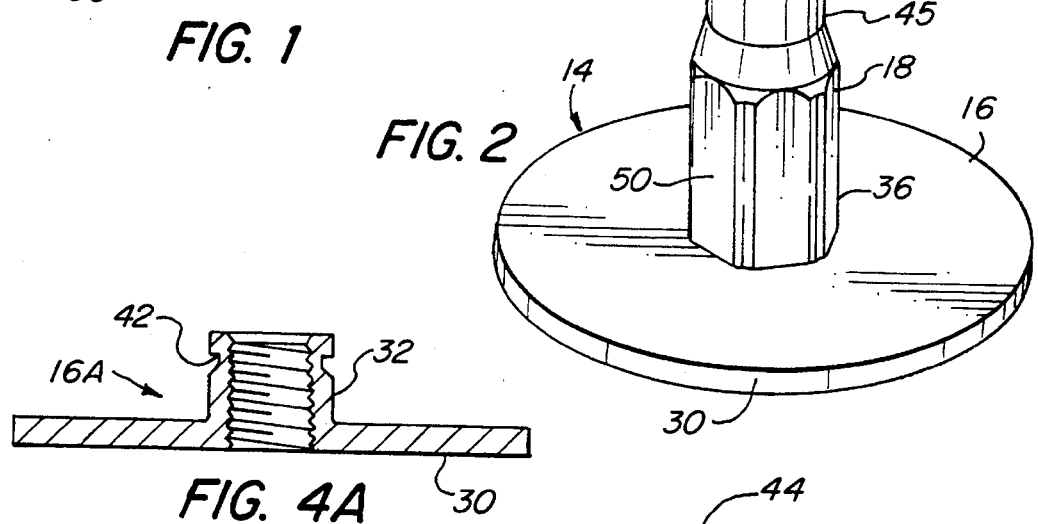
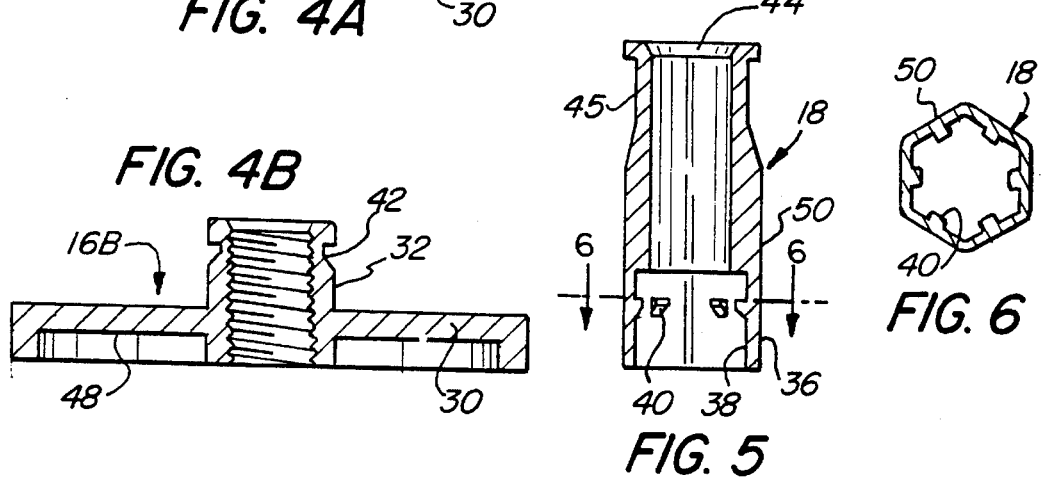

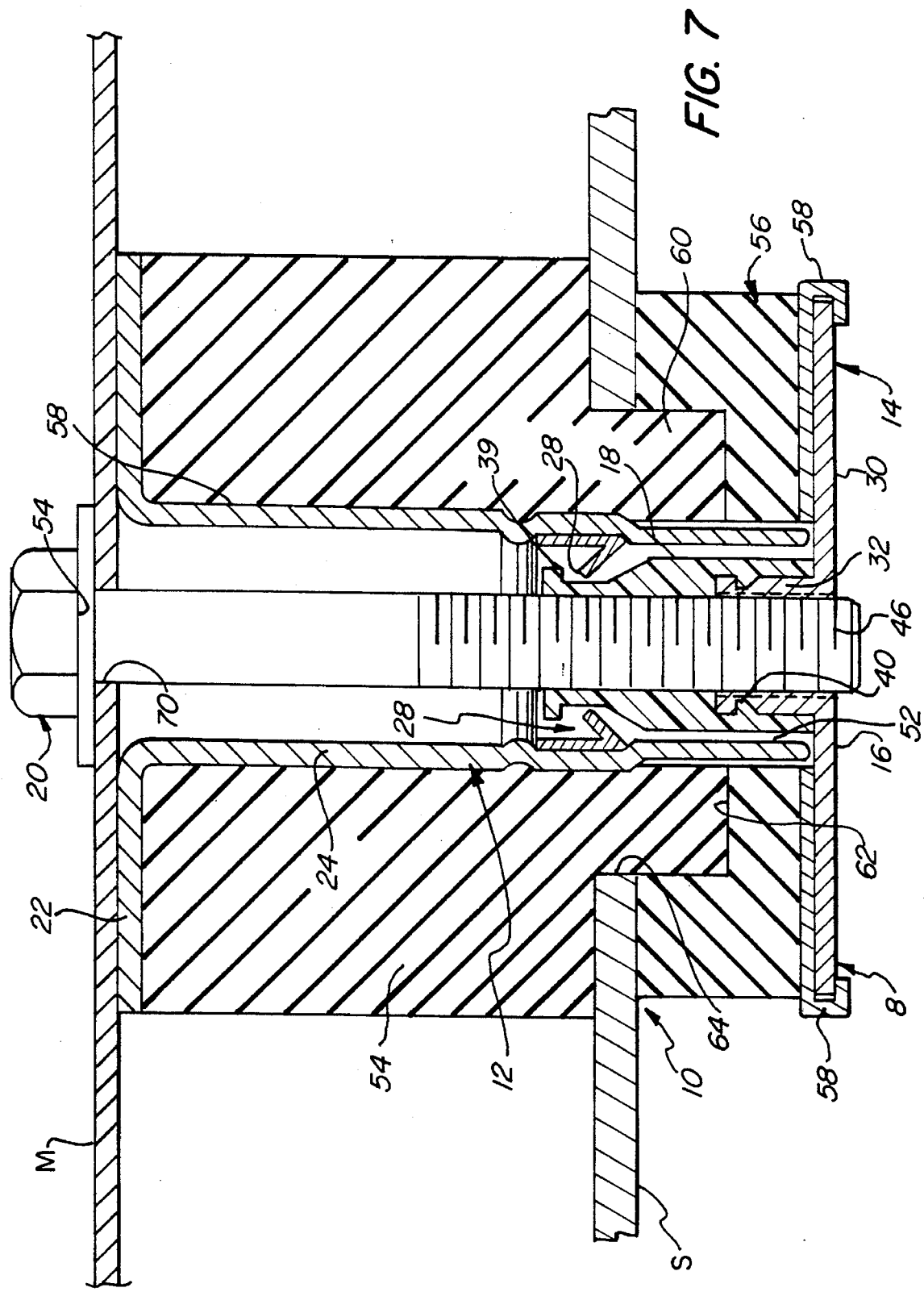

SHOCK MOUNT ASSEMBLY

FIELD OF THE INVENTION

The present invention relates to an improved shock mount assembly for securing a heavy structure, such as a vehicle body, to a support, such as the frame of a vehicle, and absorbing vibrations or shocks between the two structures.

DESCRIPTION OF THE PRIOR ART

A shock mount currently used in the automotive industry to secure truck bodies to truck frames is disclosed in U.S. Pat. Nos. 4,783,039 and 4,720,075 to Peterson et al, the disclosures of which are hereby incorporated by reference. This shock mount has been successful in the industry due to its design features which provide a telescoping metal spacer and metal thimble assembly that snap together to hold the thimble and spacer together until secured with a threaded fastener, and in which the thimble and spacer have mating surfaces to prevent either one from rotating relative to the other, thereby permitting fastening of the threaded fastener with minimal undesirable rotation of one element relative to the other.

While this known shock mount is exceptionally effective and has high strength characteristics, it does not allow for variations in strength requirements. For example, in some instances an automotive or truck manufacturer may specify that the shock mount will not separate in a barrier tests i.e., that the shock mount will not separate when the vehicle in which it is used impacts a barrier at a certain speed. In other instances, the vehicle manufacturer may specify that the shock mount will separate during a barrier test at certain speeds. Such a specification can arise when the vehicle manufacturer is designing crash protection features in which the energy of a crash is dissipated by destruction or separation of various components of the vehicle body. In such case, each shock mount must be separately designed and manufactured, increasing product cost.

It would be desirable to provide a shock mount that has the capability to be used in both the fixed and breakaway applications described above, in order to reduce component cost, and to provide flexibility in the use of such components.

SUMMARY OF THE INVENTION

It is an object of the invention to provide an improved shock mount assembly that can be flexibly adapted to different strength requirements.

It is an object of the invention that such a shock mount assembly be adaptable to provide the lowest unit manufacturing cost possible.

It is an object of the invention to provide such a shock mount with interchangeable parts suitable for each desired strength requirement.

An improved shock mount assembly in accordance with one embodiment of the invention comprises a spacer and a thimble. The spacer includes a flange and a spacer tube projecting therefrom. The thimble comprises a metal base and a plastic stem. The thimble stem fits telescopically into the spacer tube. The thimble base has an annular flange and an internally threaded post projecting therefrom. The thimble stem is a hollow part with a lower portion that fits onto the post. The post and the lower part of the stem have interfitting non-circular cross-sections to prevent rotation of the stem and base relative to each other. The post and lower portion of the stem have mating means such as a snap-in tab and slot combination to secure the stem to the post. The stem is preferably provided with a circular guide hole in its upper portion to receive and guide a threaded fastener into alignment with the internally threaded portion of the post, to minimize potential for cross-threading of the fastener with the post threading.

The present invention provides a shock isolating mount that can be adapted to give a selected separation strength by providing the base with the desired separation strength. Typically, the base will be selected respectively from one of two groups: (1) bases with a low separation strength and (2) bases with a high separation strength. A base with a low separation strength has a lesser base flange thickness, while a base with a higher separation strength has a greater base flange thickness, and may also be provided with reinforcing ribs.

The present invention thus provides the ability for shock mounts to be provided with different separation strengths depending on requirements by the selection of the appropriate base.

Other objects, aspects and features of the present invention in addition to those mentioned above will be pointed out in or will be understood from the following detailed description provided in conjunction with the accompanying drawings.

BRIEF DESCRIPTION OF THE DRAWINGS

FIG. 1 is an exploded perspective view of an embodiment of a thimble of an improved shock mount assembly accordance with the invention.

FIG. 2 is an assembled perspective view of the thimble of FIG. 1.

FIG. 3 is a top plan view of a base of the thimble of FIG. 1.

FIG. 4A is a cross-sectional view of a base having a low separation strength.

FIG. 4B is a cross-sectional view of a base having a high separation strength.

FIG. 5 is a cross-sectional view of a stem of the thimble of FIG. 1.

FIG. 6 is another cross-sectional view of the stem of FIG. 5.

FIG. 7 is a cross-sectional view of an embodiment of an assembled improved shock isolating mount in accordance with the invention used to mount a body mounting part M to a support S.

DETAILED DESCRIPTION OF THE PREFERRED EMBODIMENT

Figure 8:
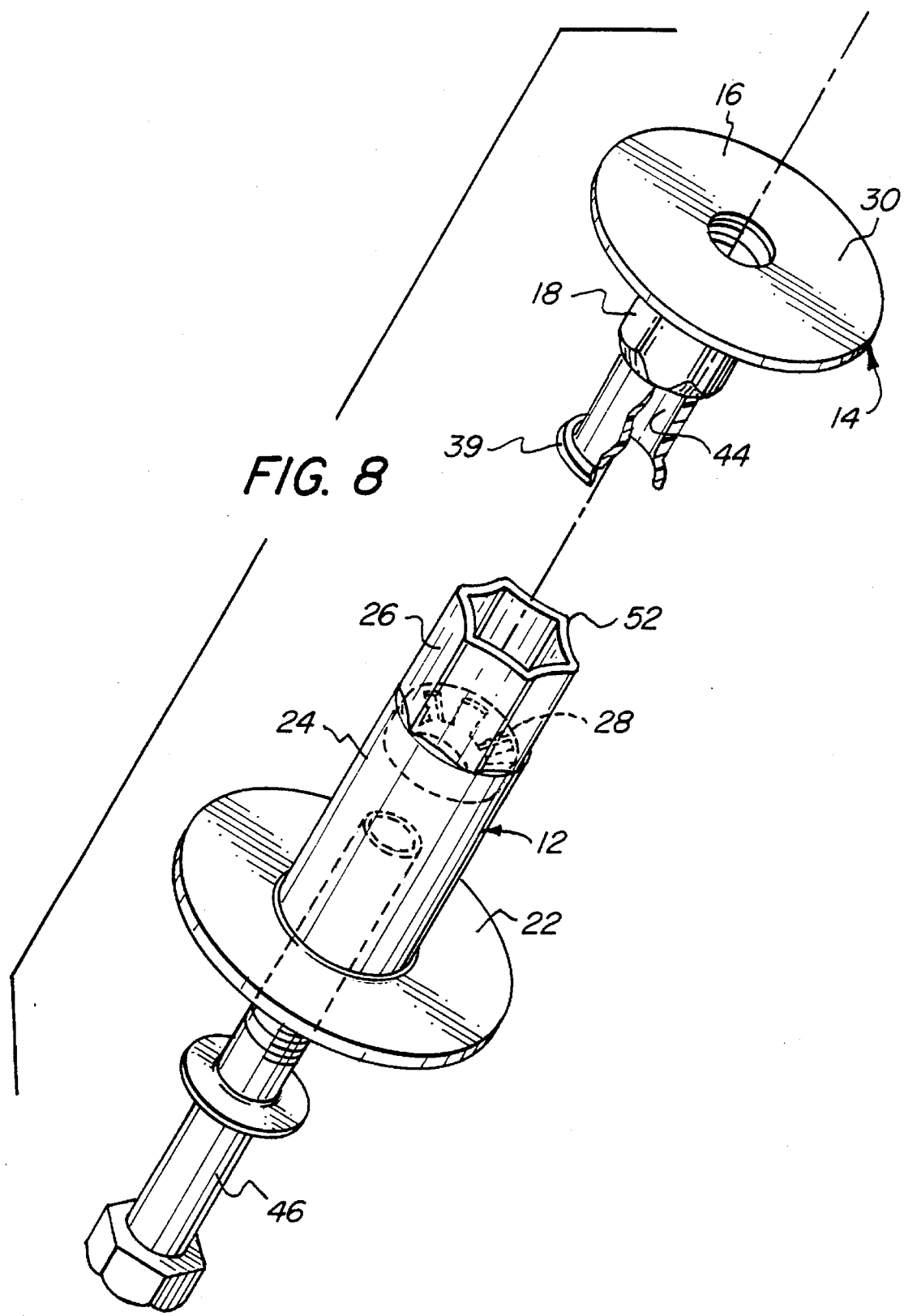
FIG. 8 is an exploded view of an embodiment of an improved shock mount in accordance with the invention.

Referring now to FIGS. 1–8, where like numerals indicate like elements in the drawings, an improved shock isolating mount 10 in accordance with one embodiment of the invention is shown. Shock isolating mount 10 (also referred to herein as a "shock mount") comprises a spacer 12 and a thimble 14. Thimble 14 comprises a base 16 and a stem 18. A fastener 20 is provided to secure together the shock mount 10.

Spacer 12 has an annular flange 22 integral with a spacer tube 24 extending perpendicularly from the flange 22. A portion 26 of the tube 24 opposite the flange 22 is formed to be non-circular in cross-section, preferably hexagonal in cross-section. A plurality of inward protrusions, such as tabbed washer 28 is fitted inside spacer tube 24, to engage the tip 39 of thimble stem 18 when the thimble stem 18 is telescopically fitted inside spacer tube 24. Spacer 12 is formed from steel or other rigid high strength materials.

The base 16 of thimble 14 is a metal part having an annular flange 30 and an internally threaded post 32 integrally formed with and projecting from flange 30. The outer wall 34 of post 32 is non-circular in cross-section; preferably outer wall 34 is hexagonal in cross-section.

Stem 18 is a plastic part, preferably formed from a thermoplastic polymer. Stem 18 is hollow, and has a lower portion 36 that has an inner wall 38 with a non-circular cross-section, preferably a hexagonal cross-section. Lower portion 36 of stem 18 receives the post 32 when base 16 and stem 18 are fitted together. The outer wall 34 of post 32 and the inner wall 38 of lower portion 36 of stem 18 interfit with each other to prevent relative rotation of the base 16 and stem 18.

Base 16 and stem 18 are provided with mating means for securing stem 18 to base 16. Preferably the mating means comprises at least one tab 40, and most preferably six such tabs 40, extending radially inwardly from the inner wall 38 of the lower portion 36 of stem 18, and a slot 42 formed on the outer wall 34 of post 32 for receiving said tabs 40. Slot 42 most preferably extends around the entire perimeter of outer wall 34 of post 32. Tabs 40, being formed with the stem 18, have a resilient characteristic, so that the stem 18 may be snap fitted onto post 32 and retained by the engagement of tabs 40 in the slot 42.

Stem 18 is provided with a circular guide hole 44 in its upper portion 45. Guide hole 44 is sized to receive the threaded fastener 20 with only a small amount of clearance. Guide hole 44 serves to guide threaded portion 46 of fastener 20 in proper alignment with the internally threaded portion of post 32, to minimize potential for cross-threading of fastener 20 when it is being secured into the post 32.

The present invention provides a shock isolating mount 10 that can be adapted to give a selected separation strength by selecting a base 16 with a desired separation strength. The desired separation strength of base 16 is determined by the force required to shear post 32 from flange 30. It is to be appreciated that if post 32 is sheared from flange 30, the assembly as shown in FIG. 7 will no longer provide a secure connection between the support S and mounting part M, thus permitting these parts to separate when subjected to sufficient force.

In the preferred embodiment, where it is desired that the shock mount fit into one of two categories of (1) shock mounts which will separate when subjected to a certain force arising from vehicle impact against a barrier, and (2) shock mounts which will not separate when subjected to the same force, the base 16 will be selected respectively from one of two groups: (1) bases with a low separation strength and (2) bases with a high separation strength.

A base 16A with a low separation strength is shown in FIG. 4A and has a flange 30 having a thickness of less than 0.125 inch. A base 16B with a high separation strength is shown in FIG. 4B and has a flange 30 having a thickness equal to or greater than 0.125 inch. Base 16B in FIG. 4B also is provided with a plurality of strengthening ribs 48. Ribs 48 are integrally formed in the lower portion of base 16B and preferably extend radially from the center of the base to its perimeter edge.

The present invention thus provides the ability for shock mounts to be provided with different separation strengths depending on requirements by the selection of the appropriate base 16. This permits standardization of all components of the shock mount 10, except for the base 16. This is an advantage, in particular because it provides significant flexibility to provide a base 16 of any desired strength. It should be appreciated that there is a need to provide a sufficient open diameter in the guide hole 44 to permit insertion of the large bolt such as a 12 mm bolt used to secure the parts together to hold a body part M to a support S. However, if a thimble 14 is made of a unitary piece of metal as in the prior art, there are limitations to the thickness of the base 16, because a thimble tube drawn from a thicker metal sheet will be too narrow to receive the fastener 20 and/or the outer diameter of the thimble tube will be too large to be received within the spacer tube. The present invention solves this problem, and permits use of a thick thimble base with higher strength characteristics, without requiring differently sized (i.e. larger diameter) spacer tubes for use with a high strength thimble. This is a significant advantage to both the parts manufacturer and the vehicle manufacturer, as it keeps the numbers of types of components to be kept in inventory to a minimum.

The shock mount 10 of the invention, in addition to the above described elements, preferably also comprises mating surfaces formed on the outer wall 50 of stem 18 and on the inner wall 52 of spacer tube 24 to prevent rotation of the thimble 14 relative to the spacer 12 when the thimble stem 18 is received in the spacer tube 24.

In addition, shock mount 10 is preferably further provided with a first elastically resilient ring 54 fitted onto the spacer tube, and a second elastically resilient ring 56 secured to the flange 30 of base 16 by tabs 58. Preferably, rings 54 and 56 are provided with a mating projecting portion 60 and cavity 62. Again, it is preferable that the projecting portion 60 and cavity 62, and the aperture 64 in support S through which the projecting portion 60 extends, be non-circular, to prevent rotation of the resilient rings 54 and 56 when the shock mount is assembled together to mount the mounting part M to support S.

It is to be appreciated that the various interfitting parts of non-circular cross-section described in this application may be oblong, oval, polygonal (including triangular, square, and pentagonal, and potentially, with greater numbers of sides), or even circular provided that one or both of the parts is provided with one or more teeth or keys fitting into a mating slot or aperture, all for the purpose of limiting relative rotation of the two parts.

Use of the shock mount of the present invention will be typically in accordance with the following procedure. The shock mount components will be partially preassembled for subsequent use on an automotive and/or truck assembly line by mounting stems 18 to the selected bases 16 and by mounting the resilient rings 54 and 56 to the spacer 12 and thimble 14 respectively.

When the shock mount is to be used on an assembly line, the manufacturing personnel will place the spacer 12 and thimble 14 on opposite sides of the support S and secure them together by fitting the end of thimble 14 into spacer tube 24 until the tip 39 of thimble 14 is engaged by washer 28. This will hold the thimble and spacer together until secured with fastener 20. Thereafter, the mounting part M is placed adjacent the spacer flange 22 and the fastener 20 is inserted through a hole in part M and through the spacer 12 to thread into and be secured to the threaded portion of post 32, thereby fastening the mounting part M to support S.

It is to be appreciated that the foregoing is illustrative and not limiting of the invention, and that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. In a shock isolating mount for securing a mounting part of a structure onto a support, said shock isolating mount having a rigid spacer having a spacer flange and a spacer tube projecting from said spacer flange, and a mating thimble, the improvement wherein said thimble comprises:

a metal thimble base having a flange and an internally threaded post projecting from said flange;

a plastic thimble stem, said stem being hollow, said stem and said base having mating means for securing said stem to said base, said stem being telescopically receivable in said spacer tube, whereby said shock isolating mount may be provided with a selected separation strength by providing said base with a desired separation strength.

2. In a shock isolating mount in accordance with claim 1, wherein said desired separation strength of said base is determined by the force required to shear said post of said base from said flange of said base.

3. In a shock isolating mount in accordance with claim 1, wherein said base has a low separation strength or a high separation strength.

4. In a shock isolating mount in accordance with claim 3, wherein said base has a low separation strength and comprises a base having a base flange thickness of less than 0.125 inch.

5. In a shock isolating mount in accordance with claim 3, wherein said base has a high separation strength and comprises a base having a base flange thickness equal to or greater than 0.125 inch.

6. In a shock isolating mount in accordance with claim 5, wherein said base further comprises a plurality of strengthening ribs.

7. In a shock isolating mount in accordance with claim 6, wherein strengthening ribs are provided in a lower portion of said base.

8. In a shock isolating mount in accordance with claim 3, wherein said post is fittable into a lower portion of said stem, and said mating means for securing said stem to said base comprises at least one tab extending radially inwardly from an inner wall of a lower portion of said stem, and a slot formed in an outer wall of said post for receiving said tab.

9. In a shock isolating mount in accordance with claim 8, wherein there are six of said tabs extending radially inwardly from said inner wall of said stem, and wherein said slot extends around an entire perimeter of said outer wall of said post.

10. In a shock isolating mount in accordance with claim 3, wherein an outer wall of said post is generally non-circular in cross-section, and wherein a lower portion of said stem has a mating non-circular cross-section, said post being fittable into said lower portion of said stem, whereby relative rotation of said stem and post is prevented by mating of said non-circular cross-sections of said post and stem.

11. In a shock isolating mount in accordance with claim 10, wherein said outer wall of said post and said lower portion of said stem are generally hexagonal in cross-section.

12. In a shock isolating mount in accordance with claim 3, wherein said stem is provided with a guide hole in an upper portion thereof to guide a threaded fastener into alignment with said internally threaded post.

13. In a shock isolating mount in accordance with claim 3, further comprising a first elastically resilient ring fitted onto said spacer tube, and a second elastically resilient ring secured to said base flange.

14. A shock isolating mount for securing a mounting part of a structure onto a support, comprising:

a rigid metal spacer having a spacer flange and a spacer tube projecting from said spacer flange; and a thimble having a metal thimble base having a flange and an internally threaded post projecting from said flange, and a plastic thimble stem, said stem being hollow, said stem and said base having mating means for securing said stem to said base, said stem being telescopically receivable in said spacer tube, whereby said shock isolating mount may be provided with a selected separation strength by providing said base with a desired separation strength.

15. A shock isolating mount in accordance with claim 14, wherein said base has a low separation strength or a high separation strength.

16. A shock isolating mount in accordance with claim 15, wherein said base has a low separation strength and comprises a base having a base flange thickness of less than 0.125 inch.

17. A shock isolating mount in accordance with claim 15, wherein said base has a high separation strength and comprises a base having a base flange thickness equal to or greater than 0.125 inch.

18. A shock isolating mount in accordance with claim 17, wherein said base further comprises a plurality of strengthening ribs.

19. A shock isolating mount in accordance with claim 15, wherein said post is fittable into a lower portion of said stem, and said mating means for securing said stem to said base comprises at least one tab extending radially inwardly from an inner wall of a lower portion of said stem, and a slot formed in an outer wall of said post for receiving said tab.

20. A shock isolating mount in accordance with claim 19, wherein there are six of said tabs extending radially inwardly from said inner wall of said stem, and wherein said slot extends around an entire perimeter of said outer wall of said post.

21. In a shock isolating mount in accordance with claim 15, wherein an outer wall of said post is generally non-circular in cross-section, and wherein a lower portion of said stem has a mating non-circular cross-section, said post being fittable into said lower portion of said stem, whereby relative rotation of said stem and post is prevented by mating of said non-circular cross-sections of said post and stem.

22. A shock isolating mount in accordance with claim 21, wherein said post is generally hexagonal in cross-section, and wherein said lower portion of said stem is generally hexagonal in cross-section to snugly receive said post.

23. A shock isolating mount in accordance with claim 15, wherein said stem is provided with a guide hole in an upper portion thereof to guide a threaded fastener into alignment with said internally threaded post.

24. A shock isolating mount in accordance with claim 15, further comprising a first elastically resilient ring fitted onto said spacer tube, and a second elastically resilient ring secured to said base flange.

25. A shock isolating mount for securing a mounting part of a structure onto a support, comprising:

a rigid metal spacer having a spacer flange and a spacer tube projecting from said spacer flange; and a thimble having a metal thimble base and a plastic thimble stem, said base having a flange and an internally threaded post projecting from said flange, an outer wall of said post being generally non-circular in cross-section, said stem being hollow and a lower portion of said stem having a non-circular cross-section for receiving said post and preventing relative rotation of said stem and post, an inner wall of said lower portion of said stem having at least one tab extending radially inwardly, said base having a slot formed in an outer wall of said post for receiving said tab to snap together said stem and post, said stem having a guide hole in an upper portion thereof to guide a threaded fastener into alignment with said internally threaded post, said stem being telescopically receivable in said spacer tube, whereby said shock isolating mount may be provided with a selected separation strength by selecting said base from a group consisting of bases with a low separation strength and bases with a high separation strength;

a first elastically resilient ring fitted onto said spacer tube; and a second elastically resilient ring secured to said base flange.

26. A shock isolating mount in accordance with claim 25, wherein said group of bases with a low separation strength comprise bases having a base flange thickness of less than 0.125 inch.

27. A shock isolating mount in accordance with claim 25, wherein said group of bases with a high separation strength comprise bases having a base flange thickness equal to or greater than 0.125 inch.

28. A shock isolating mount in accordance with claim 27, wherein said group of bases with a high separation strength further comprises bases having a plurality of strengthening ribs.

29. A shock isolating mount in accordance with claim 25, wherein said post is generally hexagonal in cross-section, and wherein said lower portion of said stem is generally hexagonal in cross-section to snugly receive said post.

* * * * *